(12) United States Patent
Overfield

(10) Patent No.: US 10,160,148 B2
(45) Date of Patent: Dec. 25, 2018

(54) MANIFOLD SYSTEM NOZZLE RETENTION

(71) Applicant: Husky Injection Molding Systems Ltd., Bolton (CA)

(72) Inventor: Sarah Kathleen Overfield, Colchester, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 149 days.

(21) Appl. No.: 15/120,528

(22) PCT Filed: Mar. 3, 2015

(86) PCT No.: PCT/US2015/018381
§ 371 (c)(1),
(2) Date: Aug. 22, 2016

(87) PCT Pub. No.: WO2015/134419
PCT Pub. Date: Sep. 11, 2015

(65) Prior Publication Data
US 2017/0217067 A1    Aug. 3, 2017

Related U.S. Application Data

(60) Provisional application No. 61/949,476, filed on Mar. 7, 2014.

(51) Int. Cl.
*B29C 45/27* (2006.01)
*B29C 45/28* (2006.01)
*B29C 45/17* (2006.01)

(52) U.S. Cl.
CPC .......... *B29C 45/2758* (2013.01); *B29C 45/27* (2013.01); *B29C 45/281* (2013.01);
(Continued)

(58) Field of Classification Search
CPC ........ B29C 45/2758; B29C 2045/2762; B29C 2045/2772; B29C 2045/2791; B29C 45/27
See application file for complete search history.

(56) References Cited

U.S. PATENT DOCUMENTS 5,507,637 A    4/1996  Schad et al.
6,669,462 B1 * 12/2003  Jenko ..................... B29C 45/27
                                                          264/328.15
(Continued)

OTHER PUBLICATIONS

International Search Report 2 pages.

*Primary Examiner* — Jill L Heitbrink

(57) ABSTRACT

A nozzle retention arrangement is provided for an injection molding manifold system, such as a hot runner manifold system. The nozzle retention arrangement couples an injection nozzle to a distribution manifold in a manner that locates the nozzle in its final operating position and applies an initial assembly load to retain the nozzle in position on the manifold to facilitate installation of a manifold system into a manifold plate. The nozzle retention arrangement may provide a compliant load application feature to limit sealing surface pressure between the nozzle and the manifold to prevent surface damage between the components, while also accommodating thermal expansion of the heated components during operation of the system. The nozzle retention arrangement may also provide a load control feature to prevent the machining quality of the nozzle bore in the manifold plate from determining the sealing load between the nozzle and the manifold.

9 Claims, 8 Drawing Sheets

(52) U.S. Cl.
CPC .......... *B29C 2045/1786* (2013.01); *B29C 2045/2762* (2013.01); *B29C 2045/2772* (2013.01); *B29C 2045/2791* (2013.01)

(56) References Cited

U.S. PATENT DOCUMENTS

| | | |
|---|---|---|
| 7,329,118 B2 | 2/2008 | Pruden et al. |
| 7,435,078 B2 | 10/2008 | Gaillard et al. |
| 7,481,649 B2 | 1/2009 | Gaillard et al. |
| 8,597,019 B2 | 12/2013 | Deriche |
| 2002/0168442 A1 | 11/2002 | Gould et al. |
| 2008/0220117 A1 | 9/2008 | Gunther |
| 2009/0194910 A1 | 8/2009 | Rosner et al. |
| 2012/0251657 A1* | 10/2012 | Adas .............. B29C 45/27 425/569 |
| 2013/0287888 A1 | 10/2013 | Overfield et al. |

* cited by examiner

MANIFOLD SYSTEM NOZZLE RETENTION

TECHNICAL FIELD

The present disclosure generally relates to the field of injection molding machines. In particular, the present disclosure is directed to a nozzle retention arrangement for a manifold system of an injection molding machine.

BACKGROUND

Pre-assembled manifold systems are resin distribution systems that are pre-wired and pre-plumbed for installation into a set of plates, such as manifold and cavity plates. For example, a manifold system may include a sprue to receive melt from a machine nozzle, a distribution manifold, actuators for valve gate systems if used, and nozzle stack components. The nozzle(s) or nozzle stack(s) must be aligned with receiving bores in the plates as the distribution manifold is located and supported by insulators that contact the plates.

SUMMARY

In one embodiment, an injection molding manifold system comprises a manifold to receive melt from a melt source and distribute the melt to one or more outlets, an injection nozzle to receive melt from an outlet of the manifold and deliver the melt to a mold cavity, and a nozzle retention mechanism coupling the injection nozzle to the manifold. The nozzle retention mechanism is constructed and arranged to apply first and second loads between the injection nozzle and the manifold. The first load is sufficient to maintain the injection nozzle in position on the manifold for installation of the manifold system. The second load is greater than the first load to create suitable sealing contact between the injection nozzle and the manifold upon installation of the manifold system.

In another embodiment, a nozzle retention mechanism is provided for an injection molding manifold system. The nozzle retention mechanism comprises a retainer constructed and arranged to retain an injection nozzle to a manifold with the injection nozzle extending from the manifold in a longitudinal direction, at least one mounting clip to mount the retainer to the manifold, and at least one spring. The mounting clip is constructed and arranged to permit linear movement of the retainer relative to the manifold in the longitudinal direction. The spring creates a variable load between the injection nozzle and the manifold when the retainer is mounted to the manifold.

BRIEF DESCRIPTION OF DRAWINGS

Various embodiments will now be described, by way of example, with reference to the accompanying drawings, in which.

DETAILED DESCRIPTION

A nozzle retention arrangement for an injection molding manifold system is described, which may be particularly suitable for retention of one or more nozzles or nozzle stacks of a hot runner manifold system. For ease of understanding, and without limiting the scope of the claimed invention, the nozzle retention arrangement is described below particularly in connection with a pre-assembled manifold system. It should be understood, however, that the nozzle retention arrangement is not so limited and may be employed in other injection molding system arrangements, as should be apparent to one of skill in the art.

Figure 1:
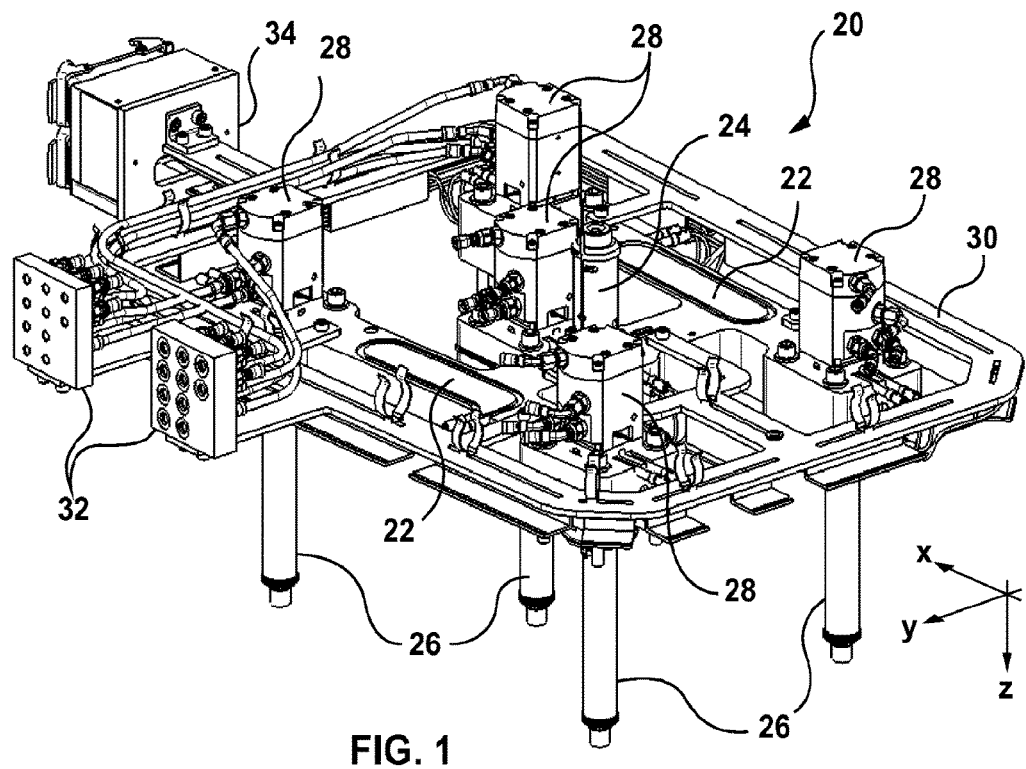
FIG. 1 is a perspective view of a pre-assembled valve gate manifold system.
Figure 2:
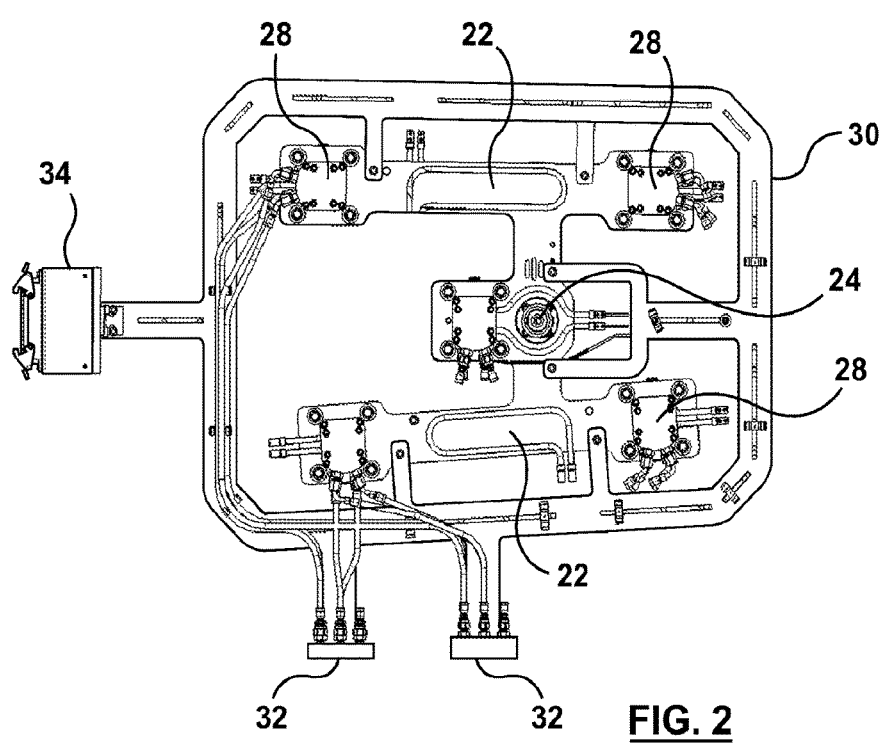
FIG. 2 is a top view of the manifold system of FIG. 1.

FIGS. 1-2 illustrate an embodiment of a pre-assembled manifold system that may be readily installed into the plate(s) of an injection molding machine. The manifold system may be pre-wired and pre-plumbed in a manner as should be apparent to one of skill in the art.

The manifold system 20 includes a distribution manifold 22 that distributes melt received from a machine nozzle (not shown) via a sprue 24. Injection nozzles 26 are coupled to the manifold 22 to receive melt that is distributed by the manifold. A nozzle retention arrangement, as described further below, is used to couple the nozzles to the manifold. Actuators 28, such as hydraulic actuators, may be mounted to the manifold 22 for driving valve stems (not shown) associated with the nozzles 26, when valve gated systems are used. It should be appreciated that the retention system and arrangement described herein may be used with other types of nozzle arrangements, such as hot tip nozzle as opposed to a valve gated nozzle. A frame 30 is mounted to the manifold 22 to facilitate the routing of cooling and plumbing lines to service blocks 32 of the manifold system. Similarly, electrical wires are routed along the frame 30 to an electrical tower 34 of the manifold system. It is to be appreciated that the manifold system may employ any number of nozzles 26 and actuators 28, if used, that may be arranged, pre-wired and pre-plumbed in any suitable manner as should be apparent to one of skill in the art.

The nozzle retention arrangement of the present disclosure may be best understood by contrasting it to other nozzle retention arrangements for manifold systems. As recognized by the inventor, a challenge associated with pre-assembled manifold systems is the retention of the nozzle components to the distribution manifold. For example, during operation, the manifold 22 and nozzles 26 are heated to a temperature that is much greater than the temperature of the plates. This temperature increase causes thermal expansion of the heated components. Because the nozzles are positioned within the bores of relatively cold plates, which do not experience a similar degree of thermal expansion, relative movement can occur, such as at the sealing interface, between the manifold and the nozzles.

Figure 3:
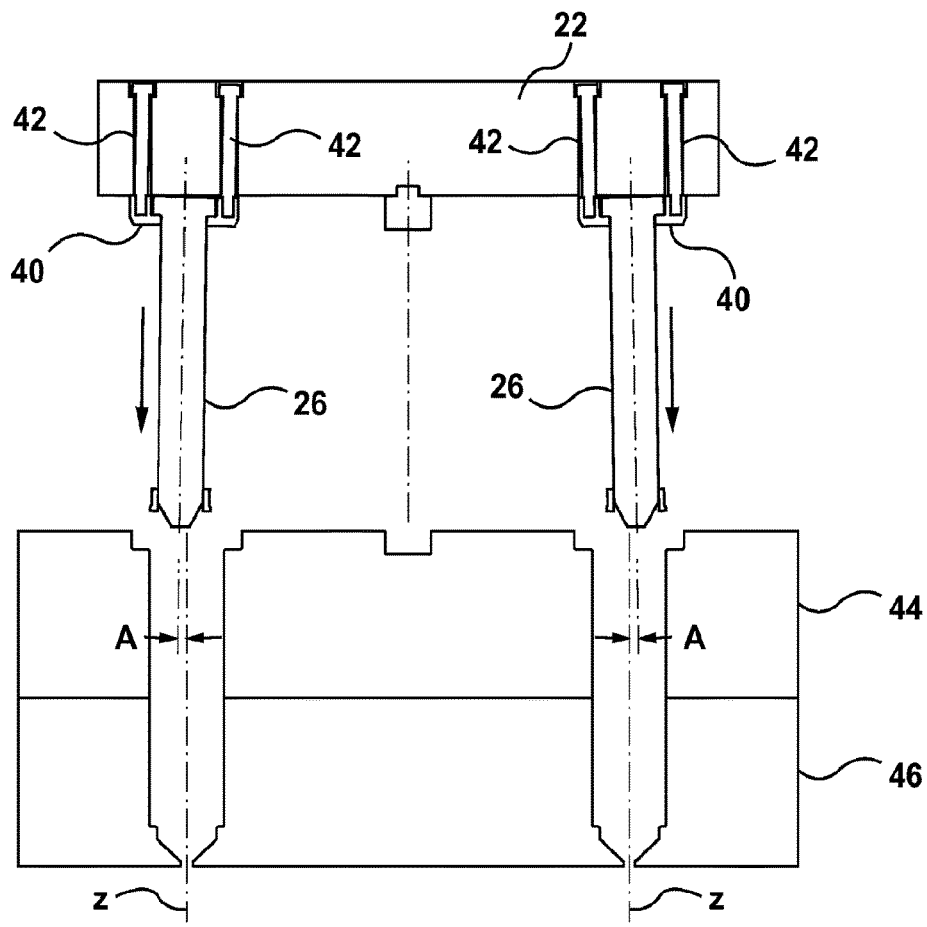
FIG. 3 is a schematic view of a pre-assembled manifold assembly being installed onto a manifold plate with the nozzles coupled to the distribution manifold using a loose nozzle retention arrangement.
Figure 4:
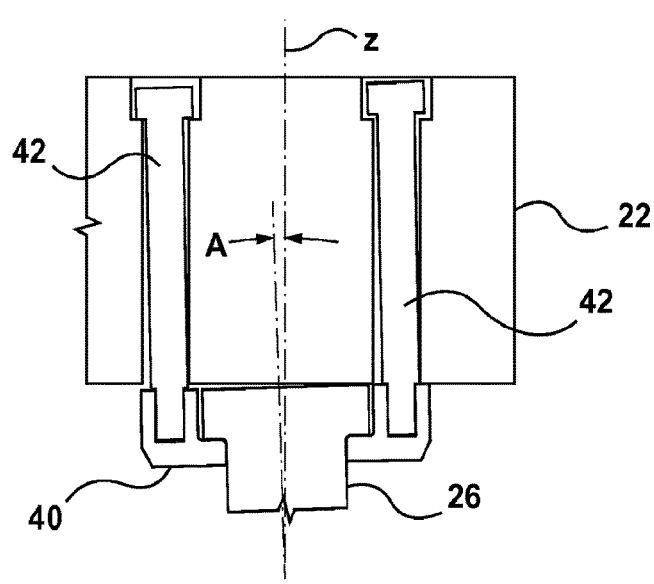
FIG. 4 is an enlarged schematic view of a nozzle coupled to a manifold with a loose nozzle retention arrangement.

In one arrangement, one or more nozzles may be coupled to a distribution manifold using a loose nozzle retention arrangement that captures the nozzle while allowing the nozzle to have some independent movement relative to the manifold. As shown in FIGS. 3-4, each nozzle 26 may be loosely coupled to the manifold 22 with a retainer 40 that is loosely secured to the manifold with several fasteners 42, such as screws. Due to the loose retention arrangement, each nozzle 26 may move out of position, such as in the X-Y plane (see FIG. 1) direction, and/or become angled A with respect to the Z-direction during installation of the manifold system into the manifold plate 44 and the cavity plate 46. Such an arrangement may render installation of the manifold system difficult with a risk of potential damage to the components. For example, each nozzle may need to be individually manipulated into position during installation.

Figure 5:
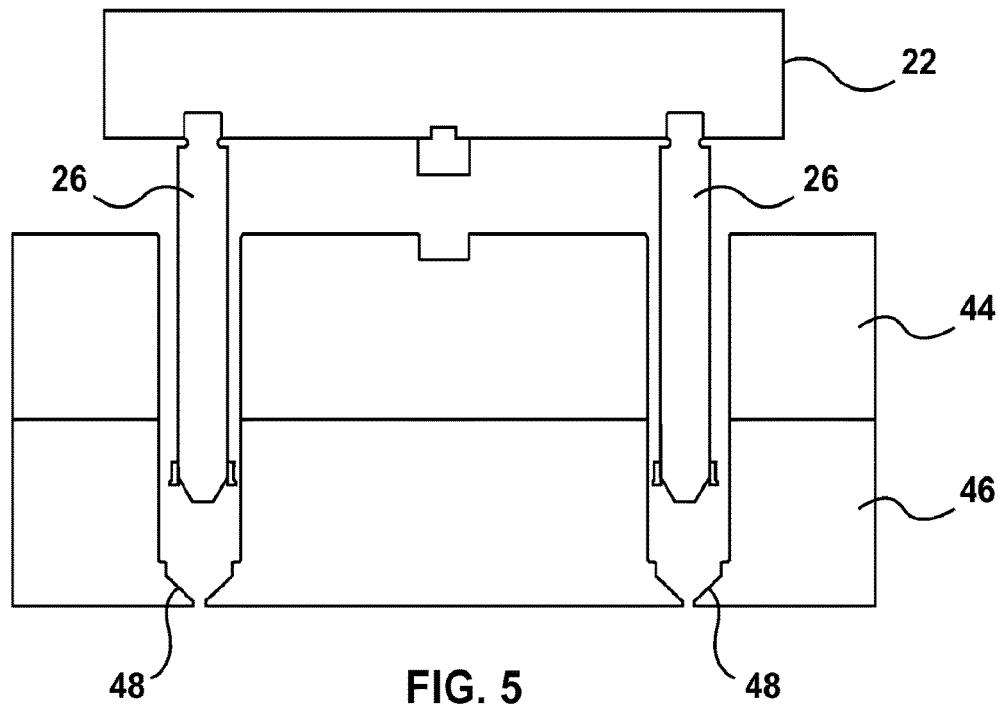
FIG. 5 is a schematic view of a pre-assembled manifold assembly being installed onto a manifold plate with the nozzles coupled to a distribution manifold using a fixed nozzle retention arrangement.

In another arrangement, one or more nozzles may be coupled to the distribution manifold using a fixed nozzle retention arrangement in which the nozzles are connected directly to the manifold. As shown in FIG. 5, the nozzles 26 are fixed to the manifold 22 in a cold drop position during installation of the manifold system. Such an arrangement may render installation of the manifold system difficult with a risk of potential damage to the components. Additionally, the manifold system may need to be heated prior to installation.

Figure 6:
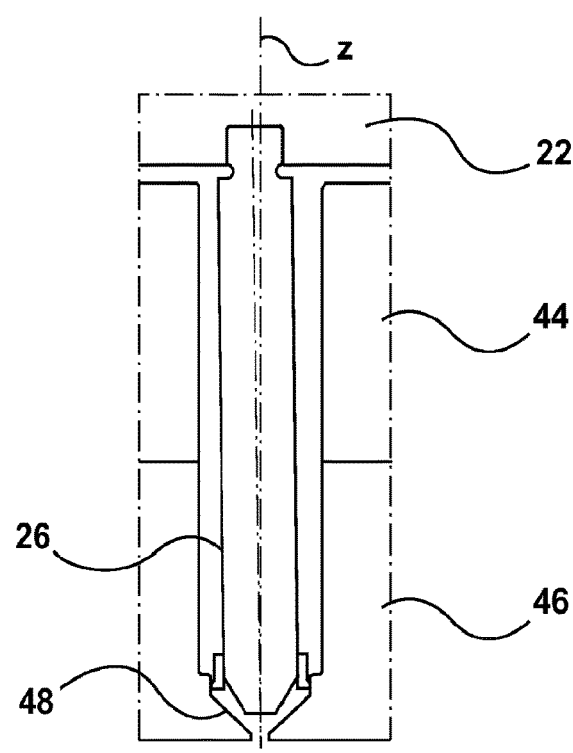
FIG. 6 is a schematic view of a nozzle installed in a manifold plate with the nozzle being coupled to the distribution manifold using a fixed nozzle retention arrangement and illustrating the nozzle being flexed due to thermal expansion.

After installation and during operation, as shown in FIG. 6, each fixed nozzle 26 bends or flexes to accommodate the differences in thermal expansion between the heated components (i.e., nozzles 26 and manifold 22) and the colder manifold and cavity plates 44, 46. The amount of thermal expansion movement that can be allowed with this arrangement is limited by the structural strength of the nozzle. Additionally, resistance to movement of the nozzle applies a corresponding force on the nozzle support features in the plates 44, 46 and the gate region 48 which may potentially lead to surface damage, wear and leakage.

Figure 7:
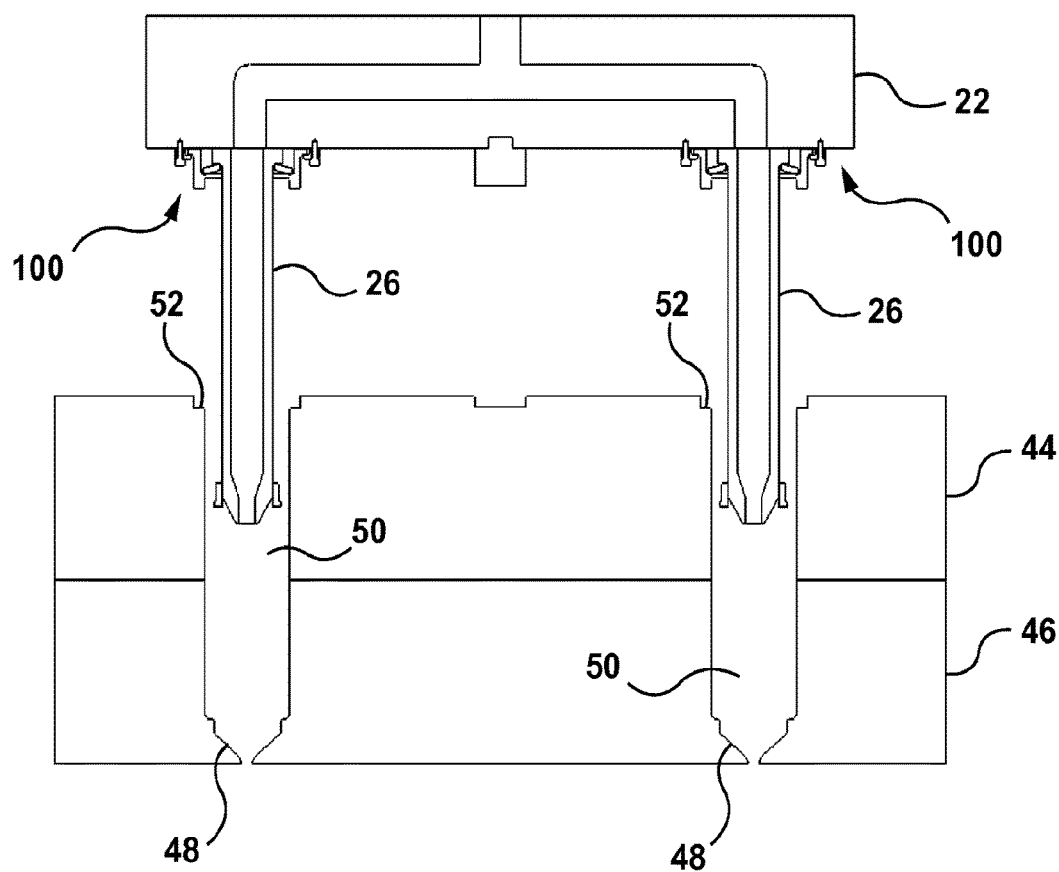
FIG. 7 is a schematic view of a manifold system being installed onto a manifold plate with the nozzles coupled to the manifold using a nozzle retention mechanism according to one illustrative embodiment.

As shown in FIG. 7, a nozzle retention arrangement is disclosed for coupling an injection nozzle 26 (or nozzle housing) to a distribution manifold 22 in a manner that locates the nozzle in its final operating position and applies an initial assembly load to retain the nozzle in the final operating position on the manifold to facilitate installation of a manifold system into a manifold plate 44 and/or cavity plate 46. The nozzle retention arrangement also provides a compliant load application feature to limit sealing surface pressure between the nozzle 26 and the manifold 22, which may include a manifold bushing 22a (FIG. 12), to prevent surface damage between the components, while also accommodating thermal expansion of the heated components relative to the colder plate(s) during operation of the system. The nozzle retention arrangement also provides a load control feature to prevent the machining quality of the nozzle bore 50 in the manifold plate 44 from determining the sealing load between the components.

The nozzle retention arrangement may be configured to apply a first load to retain the nozzle in the fixed position for installation of the manifold system and to subsequently apply a second load that is greater than the first load to create a suitable sealing contact between the nozzle 26 and the manifold 22 upon assembly of the manifold system to the manifold plate 44 and/or cavity plate 46. If desired, the nozzle retention arrangement may be configured to apply any number and/or range of loads as should be apparent to one of skill in the art.

In one illustrative embodiment shown in FIGS. 7-11, the nozzle retention arrangement includes a retention mechanism 100 that is mounted to the manifold 22 to retain the injection nozzle 26 against the manifold and to apply variable loads between the nozzle and manifold. The nozzle retention mechanism 100 includes a retainer 102 that is mounted to the manifold 22 with one or more mounting clips 104. The mounting clip(s) 104 are configured to permit the retainer 102 to move linearly in the Z-direction along the longitudinal extension of the nozzle 26. A load generator, such as a spring 106, is provided between the retainer 102 and the nozzle 26 to urge the nozzle against the manifold 22 or manifold bushing 22a (FIG. 12) to create a variable load therebetween.

Figure 8:
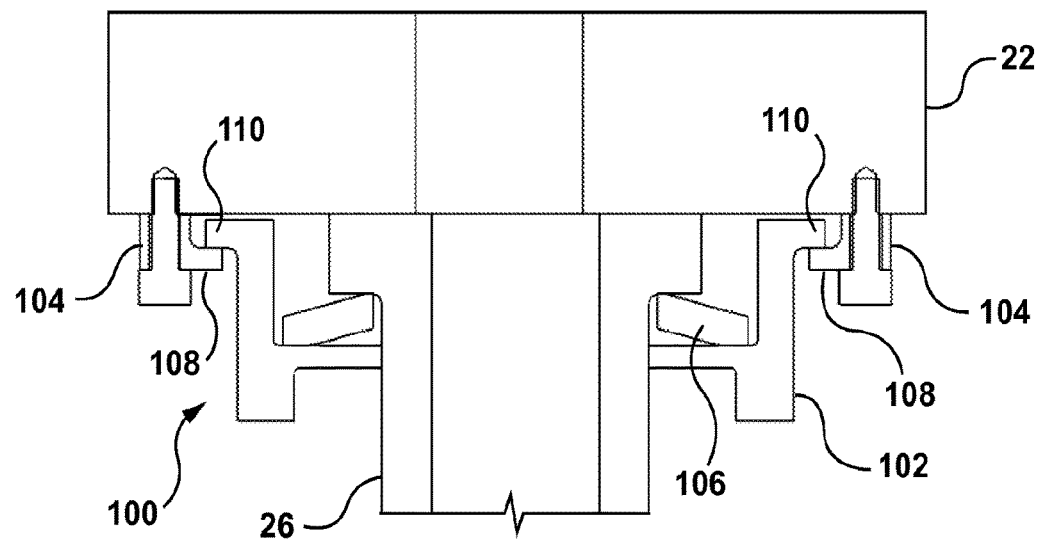
FIG. 8 is a schematic view of the nozzle retention mechanism of FIG. 7 in a first state for applying a preload between the nozzle and the manifold.
Figure 9:
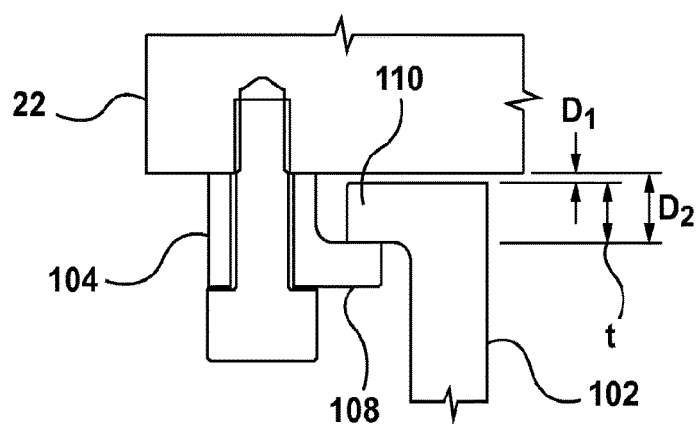
FIG. 9 is an enlarged view of a portion of the nozzle retention mechanism of FIGS. 7-8 illustrating the position of the retainer relative to the mounting clip and manifold when the mechanism is in the first state.

In one illustrative embodiment shown in FIGS. 8-9, the retainer 102 is held by the mounting clips 104 in a first position relative to the manifold 22 to apply a first load to facilitate assembly of the manifold system 20 to a manifold plate 44. The mounting clips 104 may be configured as a stepped washer, for example, so that the retainer 102 is spaced a distance $D_1$ from the manifold 22 in the first position and the spring 106 coacts with the retainer 102 to urge the nozzle 26 against the manifold or manifold bushing 22a to create a nozzle preload (i.e., first load) that is sufficient to retain the nozzle in position during installation of the manifold system.

Each mounting clip 104 may include a flange 108 that is configured to extend over and capture a shoulder 110 of the retainer 102 to retain the retainer to the manifold. In one embodiment, the mounting clip 104 is configured so that the flange 108 is spaced from the manifold by a predetermined distance $D_2$ that is greater than the thickness t of the retainer shoulder 110. This arrangement allows the retainer 102 to move toward and away from the manifold 22 by an amount that corresponds to the difference between the distance $D_1$ the flange is spaced from the manifold and the thickness t of the retainer shoulder 110. In this manner, application of the preload and sealing load may be readily controlled by movement of the retainer 102 relative to the manifold 22.

Figure 10:
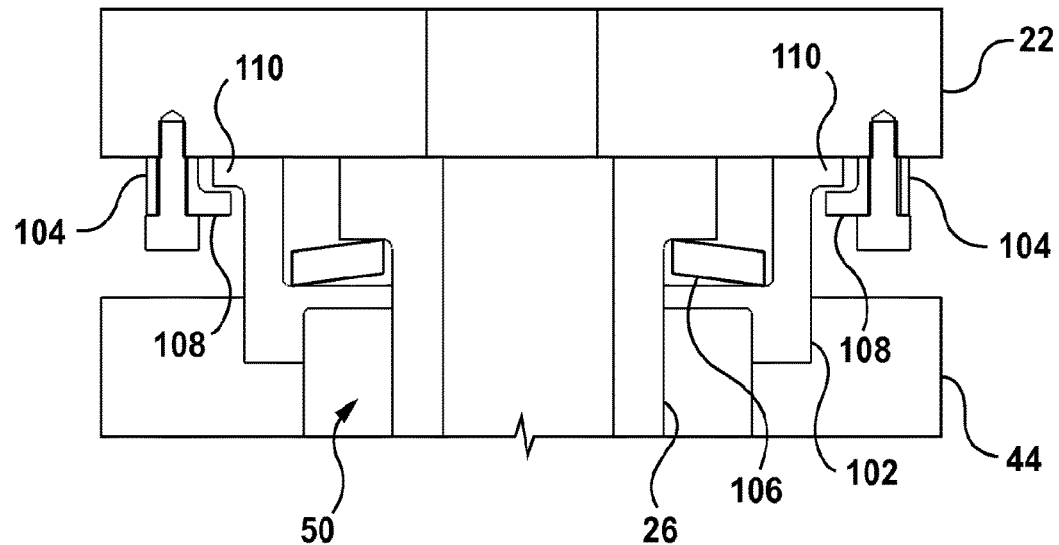
FIG. 10 is a schematic view of the nozzle retention mechanism of FIG. 7 actuated to a second state for applying a sealing load between the nozzle and the manifold.
Figure 11:
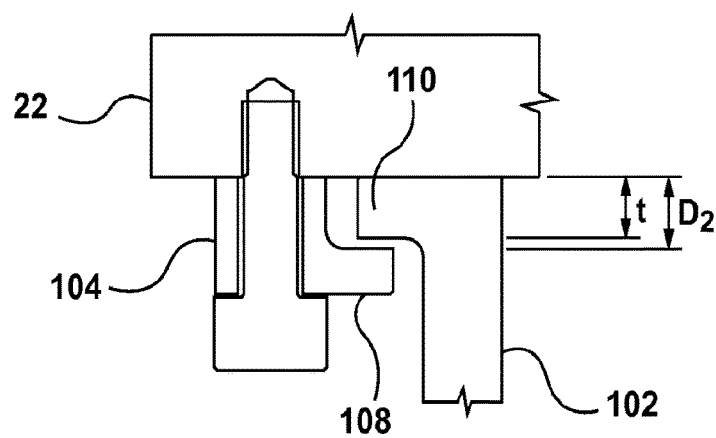
FIG. 11 is an enlarged view of a portion of the nozzle retention mechanism of FIGS. 7 and 10 illustrating the position of the retainer relative to the mounting clip and manifold when the mechanism is actuated to the second state.

As illustrated in FIG. 10-11, movement of the retainer 102 to a second position against the manifold 22 increases the load generated by the spring 106 against the nozzle 22 (i.e., second load) which creates suitable sealing contact between the nozzle 26 and the manifold 22 or manifold bushing 22a. In one embodiment, the mechanism 100 is actuated upon installation of the manifold system 20 on a manifold plate 44, whereby the retainer 102 is moved to the second position against the manifold 22.

As shown, the retainer 102 may be positioned within a counterbore 52 surrounding the nozzle bore 50 in the manifold plate 44. As the manifold 22 and the manifold plate 44 are drawn toward each other during assembly, the nozzle retention mechanism 100 is essentially squeezed between the manifold and the manifold plate which causes the retainer 102 to move to its second position against the manifold 22, thereby deflecting the spring 106 so as to increase the load applied between the nozzle 26 and the manifold 22 or manifold bushing 22a to create a suitable sealing contact therebetween. In this manner, the retainer 102 limits the load and consequently the amount of sealing contact that can be generated between the nozzle and the manifold 22 or manifold bushing 22a despite any manufacturing variations that may exist in the manifold plate 44, such as the machining quality of the bore 50 or counterbore 52 provided in the manifold plate.

The nozzle retention mechanism 100 may be configured to provide any suitable amount of preload and sealing load as may be desired for a particular application. In one illustrative embodiment, the nozzle retention mechanism 100 is configured to apply a preload of 100 lbf to 10,000 lbf and a sealing load of 200 lbf to 30,000 lbf. The mechanism employs a spring 106 having a spring constant of 0.0005 mm/lbf to 0.00005 mm/lbf with the retainer 102 being displaceable 0.01 mm to 3 mm upon actuation. In one embodiment, the spring is a Belleville washer. It is to be appreciated, however, that the nozzle retention arrangement may employ other suitable load generating arrangements to provide any desired loads as should be apparent to one of skill in the art.

Figure 12:
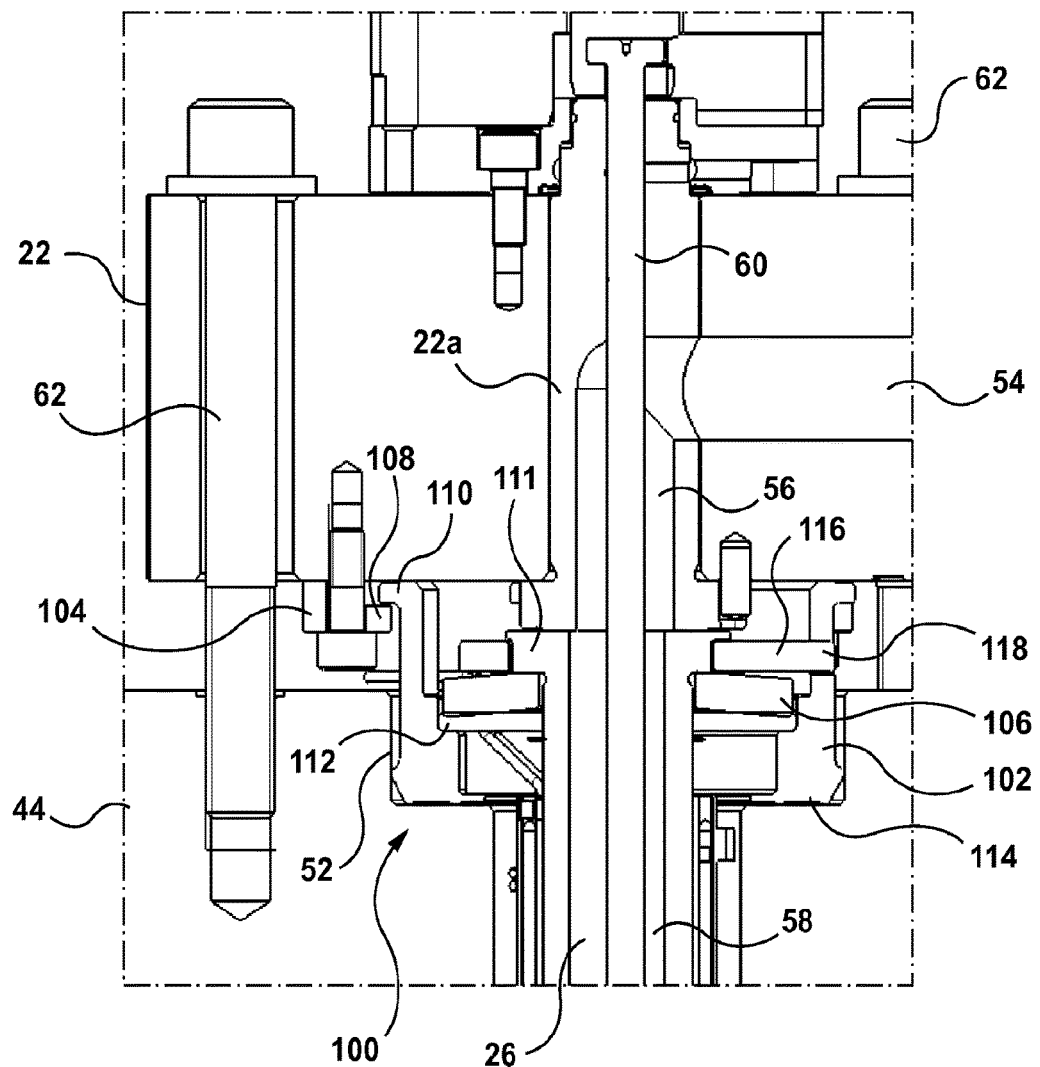
FIG. 12 is a cross-sectional view of a portion of a manifold system assembled to a manifold plate with a nozzle coupled to the manifold using a nozzle retention mechanism according to another illustrative embodiment.

FIG. 12 illustrates an embodiment of a nozzle retention mechanism implemented with a manifold system 20 that is installed and assembled to a manifold plate 44 of an injection molding system, such as a hot runner system. As shown, a nozzle 26 is coupled to the manifold 22 with the nozzle retention mechanism 100 and in engagement with a manifold bushing 22a provided at an outlet of the manifold. The bushing 22a receives melt from a melt channel 54 of the manifold and delivers the melt via a bushing channel 56 to the nozzle channel 58. As shown, a valve stem 60 may extend through the manifold bushing channel 56 and the nozzle channel 58. The nozzle 26 extends through a nozzle bore 50 in the manifold plate 44.

The nozzle retention mechanism 100 includes a retainer 102 that is positioned within a cavity or counterbore 52 located at a proximal end of the nozzle bore 50 in the manifold plate 44. As illustrated, the retention mechanism has been actuated from a first state with the retainer 102 engaged by the mounting clips 104, such as shown in FIGS. 8-9, to a second state with the retainer 102 moved out of engagement with the mounting clips 102 and against the manifold 22, such as shown in FIGS. 10-11. Actuation of the retainer 102 to the second state, as shown, deflects a portion of the spring 106 toward the manifold 22 to increase the load applied by the spring 106 against the shoulder 111 of the nozzle 26. This increased load in turn creates a desired amount of sealing contact between the sealing surfaces of the nozzle and the manifold bushing.

As shown in the illustrative embodiment, the nozzle retention mechanism 100 includes a locator 112 that is configured to position (in the X-Y plane) the nozzle 22 within the retainer 102. As shown, the locator 112 is positioned between the distal end 114 of the retainer 102 and the spring 106 and provides an uninterrupted bearing surface for the spring. The spring 106 in turn directly engages the shoulder 111 of the nozzle 26. It is to be understood that other arrangements may be implemented to position the nozzle 26 within the retainer 102 as should be apparent to one of skill in the art.

Figure 13:
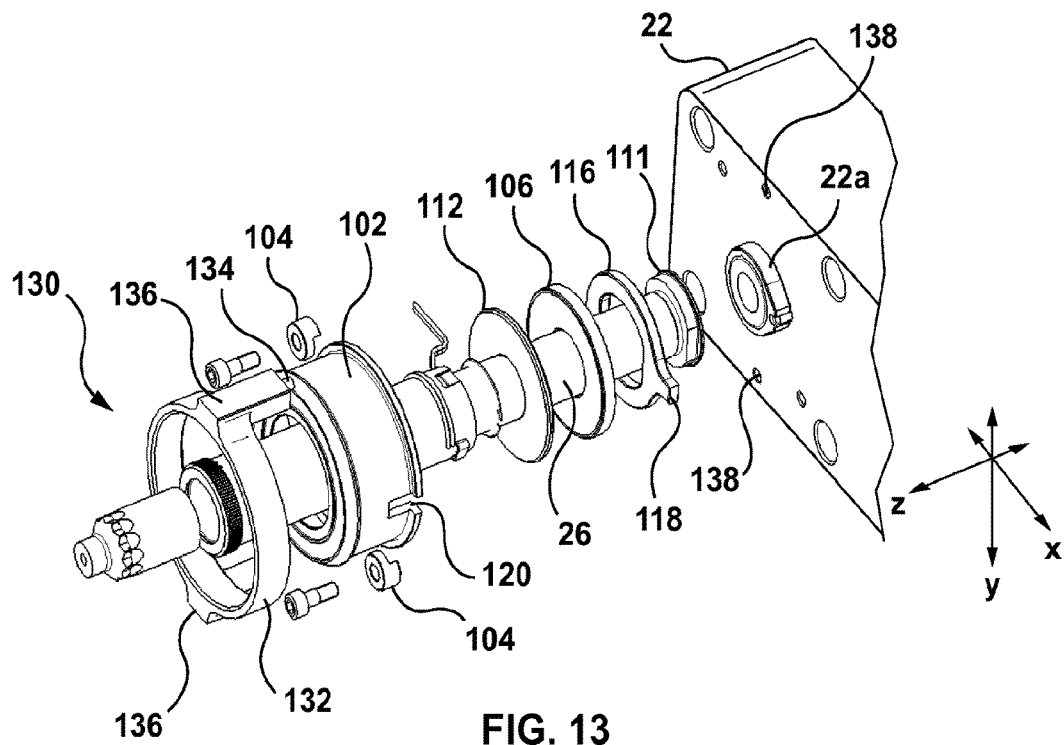
FIG. 13 is an exploded view of the nozzle retention mechanism of FIG. 12 and an installation tool according to one illustrative embodiment for positioning the nozzle and the nozzle retention mechanism on the manifold.

As shown in the illustrative embodiment, the retention mechanism 100 also includes an anti-rotation device 116 that is configured to mate with the nozzle shoulder 111 and engage a portion of the retainer 102 to prevent rotation of the nozzle 26 about its longitudinal axis (Z-direction) relative to the manifold 22. As shown in FIG. 13, the nozzle shoulder 111 and the anti-rotation device 116 have corresponding configurations with a double-D shapes that engage and prevent relative rotation therebetween. The anti-rotation device includes a tab 118 that mates with a corresponding feature, such as an opening 120, in the retainer 102 to lock the components together to prevent rotation of the nozzle 26. It is to be understood that other arrangements may be implemented to prevent rotation of the nozzle 26, if desired, as should be apparent to one of skill in the art.

As shown in FIG. 12, the manifold 22 may be secured to the manifold plate 44 using fasteners 62, such as screws, that may be located about each nozzle stack. Because the retainer 102 limits separation of the manifold 22 from the manifold plate 44 in the assembled system, the nozzle retention mechanism 100 essentially eliminates the influence that fastening the manifold 22 to the manifold plate 44 would otherwise have on the sealing load between the nozzle 26 and the manifold bushing 22a.

Figure 14:
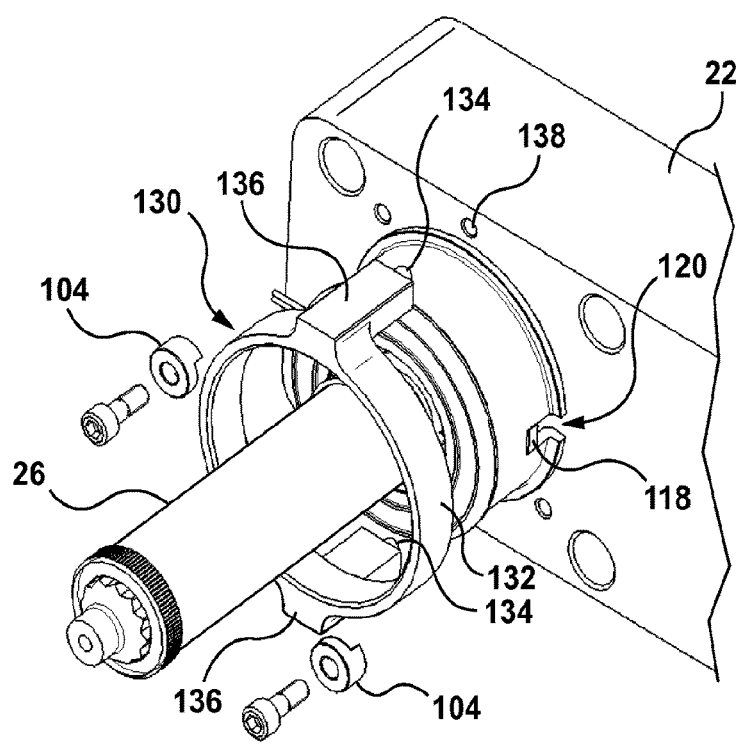
FIG. 14 is a perspective view of the installation tool of FIG. 13 being placed over the nozzle retention mechanism to position the nozzle on the manifold.

To facilitate assembly of a nozzle 26 to a manifold 22, it may be desirable to employ an installation tool for precisely locating the nozzle and the nozzle retention mechanism 100 in the desired position on the manifold. In one illustrative embodiment as shown in FIGS. 13-14, an installation tool 130 includes a body 132 that is configured to be placed over and closely conform to the shape of the retainer 102 of the nozzle retention mechanism 100. As shown, the tool body 132 has a circular or ring-like configuration that corresponds to the shape of the retainer 102. However, the installation tool may employ other suitable configurations as should be apparent to one of skill in the art.

The installation tool 130 also includes a pair of locating pins 134 that extend from leg extensions 136 provided on opposite sides of the tool body 132. The pins 134 are configured to mate with corresponding locating holes 138 precisely located adjacent a manifold bushing 22a of the manifold 22 to locate and fix the nozzle 26 in the desired position via the retention mechanism. Of course, other suitable installation tool configurations, as should be apparent to one of skill in the art, may be employed, if desired, to facilitate installation of a nozzle and nozzle retention mechanism.

The nozzle retention arrangement of the present invention may provide several non-limiting benefits and/or advantages over other retention arrangements. The nozzle retention mechanism can provide control and limitation of the force that is applied to the nozzle sealing surfaces. In this manner, the arrangement optimizes the seal interface pressure to ensure no leakage while also limiting the amount of surface damage that may be caused by the sealing force applied to the seal faces as they move laterally relative to each other due to thermal expansion of the components during operation. The nozzle pre-positioning features and cold condition assembly retention arrangement provide ease of manifold system installation into the bore of the receiving plate. The retention arrangement does not require a special installation procedure that may involve the application of heat to the manifold system. In this manner, the nozzles can be fixed in the cold condition for easy installation, while allowing for thermal expansion of the manifold without damaging the components of the manifold system.

It should be understood that the foregoing description of various embodiments are intended merely to be illustrative thereof and that other embodiments, modifications, and equivalents are within the scope of the invention recited in the claims appended hereto. It should be understood that the above description is set out with reference to the figures, which show various illustrative embodiments. The illustrative embodiments described herein are not necessarily intended to show all aspects of the invention, but rather are used to describe one or more illustrative embodiments. Thus, the claimed invention is not intended to be construed narrowly in view of the illustrative embodiments. It should be appreciated, then, that the various concepts and embodiments discussed herein may be implemented in any of numerous ways, as the disclosed concepts and embodiments are not limited to any particular manner of implementation. In addition, it should be understood that the above disclosed features may be used alone or in any suitable combination, as aspects of the invention are not so limited.

What is claimed is:

1. A nozzle retention mechanism for an injection molding manifold system, the nozzle retention mechanism comprising:
    a retainer constructed and arranged to retain an injection nozzle to a manifold with the injection nozzle extending from the manifold in a longitudinal direction;
    at least one mounting clip to mount the retainer to the manifold, the mounting clip constructed and arranged to permit linear movement of the retainer relative to the manifold in the longitudinal direction; and
    at least one spring to create a variable load between the injection nozzle and the manifold when the retainer is mounted to the manifold, wherein the spring creates a first load when the retainer is in a first position relative to the manifold, and wherein the retainer is constructed and arranged to receive a second load in a second position to create suitable sealing contact between the injection nozzle and the manifold upon installation of the manifold system into a manifold plate and a cavity plate.

2. The nozzle retention mechanism of claim 1, wherein when the second position comprises the retainer being moved out of engagement with the mounting clip and against the manifold.

3. The nozzle retention mechanism of claim 2, wherein the second load is created by movement of the retainer from the first position to the second position.

4. The nozzle retention mechanism of claim 3, wherein the retainer is moved toward the manifold into the second position.

5. The nozzle retention mechanism of claim 4, wherein the second load is limited by movement of the retainer against the manifold.

6. The nozzle retention mechanism of claim 2, wherein the mounting clip includes a flange and the retainer includes a shoulder that is captured between the flange and the manifold when the retainer is mounted to the manifold, the shoulder of the manifold having a thickness and the flange of the mounting clip being located a distance from the manifold that is greater than the thickness of the shoulder by an amount that permits movement of the retainer from the first position to the second position.

7. The nozzle retention mechanism of claim 6, wherein the shoulder of the retainer engages the flange of the mounting clip when the retainer is in the first position and the shoulder of the retainer is spaced from the flange of the mounting clip when the retainer is in the second position.

8. The nozzle retention mechanism of claim 1, wherein the at least one spring is deflectable to vary the load between the injection nozzle and the manifold.

9. The nozzle retention mechanism of claim 8, wherein the spring includes a Belleville washer.

* * * * *